P. L. MARDIS.
CONTROL APPARATUS.
APPLICATION FILED NOV. 7, 1916.
1,326,360. Patented Dec. 30, 1919.
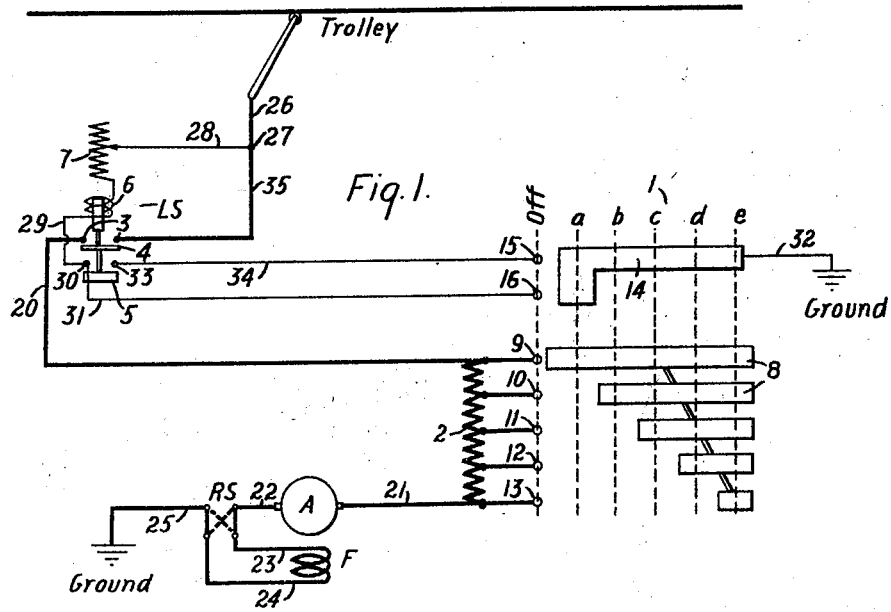
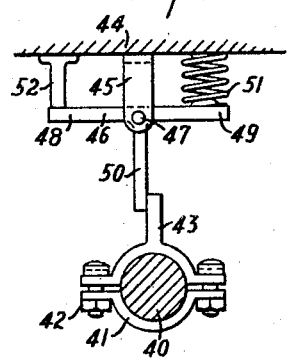
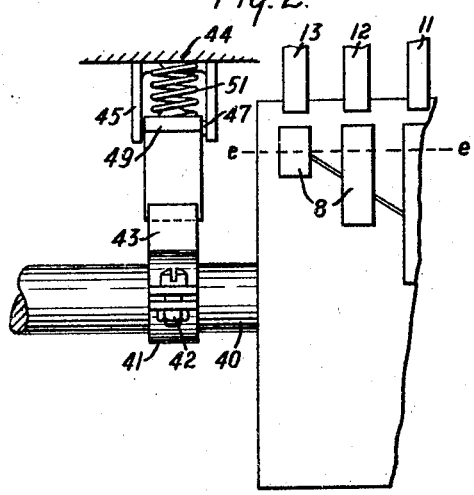
WITNESSES:
Fred A. Find
W. R. Coley
INVENTOR
Paul L. Mardis
BY
Chesley G. Carr
ATTORNEY ic
UNITED STATES PATENT OFFICE.

PAUL L. MARDIS, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,326,360.   Specification of Letters Patent.   Patented Dec. 30, 1919.

Application filed November 7, 1916. Serial No. 129,969.

*To all whom it may concern:*

Be it known that I, PAUL L. MARDIS, a citizen of the United States, and a resident of Wilkinsburg, in the county of Allegheny and State of Pennsylvania, have invented a new and useful Improvement in Control Apparatus, of which the following is a specification.

My invention relates to control apparatus and especially to drum-type controllers for electric railway motors and the like.

In the prior art, controllers of the type in question have usually been employed to gradually exclude resistance from a machine circuit, or an equivalent function, when operated in one direction through their successive positions and have then been moved backwardly through all their positions to the normal or "off" position.

One object of my present invention is to reduce the wear of electrical and mechanical parts of controllers and, in addition, to prevent the injurious arcing and burning of contact members that has occurred in many prior controllers.

More specifically stated, it is an object of my invention to provide a "line switch" in combination with a control drum that is adapted for unlimited movement in a forward direction, the circuits being arranged in such manner that the opening and closing of the machine circuit is always effected by the "line switch," while the control drum may be operated directly from its final running position to the "off" position without requiring the return movement of the controller.

Another object of the invention is to freely permit the forward or the backward movement of a controller drum or other switching device from any of its operative positions, but, after the drum has been forwardly rotated to its "off" position, backward movement thereof, which would reconnect the machine directly across the supply circuit and thus effect damage to the machine, is entirely precluded.

My invention may best be understood by reference to the accompanying drawing, wherein Figure 1 is a diagrammatic view of a system of control arranged in accordance with my present invention; Fig. 2 is a view, in side elevation, of a portion of a control drum and of a mechanical interlocking device that is associated therewith in a manner to be described; and Fig. 3 is a view, in end elevation, of the mechanical interlocking device referred to.

The system shown in Fig. 1 comprises suitable supply-circuit conductors respectively marked "Trolley" and "Ground"; a dynamo-electric machine having an armature A and a field winding F of the series type; a "line switch" LS for connecting the positive supply-circuit conductor Trolley to the machine, under conditions to be set forth; a reversing-switch RS for a well-known purpose; and a switching device 1, preferably of the familiar drum type, for gradually varying the active circuit resistance of a resistor 2 that is connected in series relation with the main machine, as is customary.

The "line switch" LS is shown as being of a familiar electrically-controlled type, comprising a pair of stationary contact members 3 which are bridged by a movable contact member 4 in the closed position of the switch; an auxiliary circuit interlocking or contact member 5 that is associated with, and moved by, the switch in a familiar manner, to perform a function to be described; and a suitable actuating coil 6. In the present instance, a resistor 7 is connected in circuit with the actuating coil 6 by reason of the fact that trolley voltage is employed to energize the coil. It will be understood, however, that the use of the resistor 7, or the type of energy source that is utilized for energizing the coil 6, is immaterial to my present invention.

The controller 1 is preferably of the familiar drum type, normally occupying the illustrated "off" position and having a plurality of successive operative positions *a* to *e*, inclusive. A contact segment 8 of a familiar form is movable with the drum and is of a configuration suitable for successively engaging a plurality of control fingers 9 to 13, inclusive, for gradually excluding predetermined sections of the resistor 2 from circuit.

An auxiliary-circuit contact segment 14 is also provided upon the controller 1 to engage contact fingers 15 and 16 for controlling the operation of the line switch LS, as hereinafter described in detail.

The controller 1 is adapted for unlimited movement in the forward direction, that is to say, direct-actuation of the drum from the final operative position *e* to the normal " off " position is permissible, instead of the customary complete return movement of the drum. However, it will be understood that some form of position-accentuating device, such as the familiar pawl-and-star-wheel arrangement, although not illustrated, is preferably utilized.

The reversing switch RS, for the sake of simplicity and clearness, is here illustrated in a conventional manner, although, preferably, the familiar drum type of reversing switch is employed and is mechanically interlocked with the main control drum 1 in the customary manner. Inasmuch as the operation of my invention pertains only indirectly to the type of controlling devices employed, it is not deemed necessary to further describe the well-known relation of the main and the reversing drums.

Assuming that it is desired to effect acceleration of the machine, the controller 1 may be actuated toward its initial operative position *a*, whereupon the control finger 9 first engages the contact segment 8 of the controller, thus connecting the left-hand terminal 3 of the line switch to the control drum through conductor 20 and the control finger 9, the remainder of the motor circuit (not yet energized) being completed from conductor 20 through the entire resistor 2, conductor 21, main armature A, conductor 22, certain contact members (not shown) of the reversing-switch RS, conductor 23, field winding F, conductor 24, reversing switch RS and conductor 25 to the negative supply-circuit conductor Ground.

As soon as the controller 1 reaches its initial operative position *a*, an auxiliary circuit is completed from the trolley through conductor 26, junction point 27, conductor 28, the resistor 7, the actuating coil 6 of the line switch LS, conductor 29, auxiliary or interlocking contact finger 30 of the line switch, conductor 31, control finger 16, the contact segment 14 of the controller 1, and conductor 32 to any convenient grounded part, such as the controller shaft. Thus, the switch LS is closed to complete a main circuit from the junction-point 27 through conductor 35 and the coöperating stationary and movable contact members 3 and 4, respectively, of the switch to conductor 20, whereby the above-traced main circuit is energized, and the motor is started into operation, with the entire resistor 2 in series-circuit relation therewith.

The closure of the line switch LS also completes a " holding-in " circuit for the actuating coil 6, comprising control finger 15, which engages the auxiliary contact segment 14, conductor 34 and the auxiliary contact fingers 33 and 30 which are bridged by the interlock contact member 5. In this way, the actuating coil 6 of the line switch is maintained energized during the actuation of the controller through its operative positions, even though the initial energizing circuit of the actuating coil is interrupted as soon as the controller 1 is moved to its second operative position *b*, by reason of the disengagement of the control finger 16 from the contact segment 14. The purpose of such arrangement of the control fingers 15 and 16 is to prevent an undesirable reconnection of the machine to the supply circuit upon the backward movement of the controller from the " off " position to the final position *e*, as subsequently set forth in detail.

Further movement of the controller 1 through its operative positions *b* to *e*, inclusive, serves to gradually exclude the resistor 2 from the motor circuit as will be appreciated without further description.

When it is desired to cut off power from the motor, the controller 1 is merely actuated in the forward direction beyond the final operative position *e* to the "off" position which, of course, may be located adjacent to the position *e* in a properly designed drum controller. By so doing, the auxiliary contact segment 14 first breaks contact with the control finger 15, thereby deënergizing the actuating coil of the line switch LS and, consequently, opening the motor circuit before the main contact segment 8 of the controller is disengaged from the control fingers 9 to 13, inclusive. Thus, both the initial closure and the initial opening of the motor circuit is effected entirely by the switch LS and, therefore, no material arcing or burning of control fingers and contact segments upon the controller 1 can possibly occur. Moreover, the mechanical wear of parts is reduced to a minimum by reason of the elimination of the customary return movement of the controller, thereby insuring a relatively long life to the equipment.

As will be appreciated, without detailed description, a backward movement of the controller from the illustrated " off " position to the final operative position *e* would produce very injurious results, and the present invention provides a simple and reliable means for precluding such undesirable operation.

In the case that is illustrated in Fig. 1, after the switch LS has been opened by reason of the forward movement of the controller 1 beyond the final operative position *e*, as previously described, the actuating coil 6 of the switch cannot again be energized by backward movement of the controller until the initial position *a* is reached, since the control finger 15 cannot be energized when the switch is open, by reason of the location of the interlocking contact member 5, and the actuating coil 6 can be energized only through the control finger 16, which engages the auxiliary contact segment 14 of the controller in position *a* only of the controller. Consequently, the above-mentioned undesirable direct connection of the motor across the supply circuit by backward movement of the controller is completely prevented and the reclosure of the motor circuit can be effected only when the entire resistor 2 is included in circuit with the motor.

Fig. 2 and Fig. 3 illustrate a mechanical means for performing a similar preventive function: generally stated, the controller 1 is freely permitted to pass beyond the final operative position *e* to the "off" position, but is mechanically interlocked from being returned from the "off" position to the final operative position *e*; or, in other words, substantially unrestricted forward movement of the controller is permitted, but undesirable backward movement thereof is precluded, although backward movement from any one operative position to another is also permitted.

The structure illustrated in Fig. 2 comprises the controller drum 1, which is provided with the usual operating shaft 40, to the lower end of which a suitable split sleeve 41 may be clamped by bolts 42, or otherwise. The sleeve device 41 is provided with an extending arm or projection 43, for a purpose to be described.

The mechanical interlocking or stop member that coöperates with the sleeve device 41 is suitably secured to any convenient stationary portion 44 of the controller, and comprises a centrally located U-shaped standard or supporting member 45 and a T-shaped member 46 which is mounted upon a pin or shaft 47 that is rigidly secured to the outer ends of the arms of the U-shaped member 45.

The T-shaped member 46 comprises three arms 48, 49 and 50, the former two of which normally extend in horizontal alinement, while the other arm 50 joins the horizontal arms at their junction-point and extends substantially at right angles to the first-mentioned arms. The pin 47 extends through the common junction-point of the three arms.

A suitable helical spring 51, under compression, is located between the horizontal arm 49 and the stationary portion 44 of the controller, while a stationary post or stop member 52 is placed between the controller portion 44 and the other horizontal arm 48. The projection or arm 43 of the sleeve device 41 is of a length sufficient to engage the vertically extending arm 50 of the T-shaped member 46, and the arrangement of parts is such that a forward movement of the controller from the final position *e* to the "off" position causes projection 43 to strike the left-hand side of the arm 50, whereby the forward movement in question is substantially unrestricted by reason of the yielding action of the spring 51 and the associated T-shaped member 46. However, an attempted return movement of the controller 1 from the "off" position to the final operative position *e* is prevented by reason of the engagement of the projection 43 with the right-hand side of the vertical arm 50, further movement of the T-shaped member 46 being stopped because of the engagement of the horizontal arm 48 and the stationary stop member 52, as illustrated. Thus, the above-mentioned undesirable circuit conditions that would result by the return movement of the controller from the "off" position to the final position *e* are effectively precluded.

The electrical means illustrated in Fig. 1 and the mechanical means of Figs. 2 and 3 should preferably both be employed in connection with the same control drum, thereby affording a double preventive check against the closing of the motor circuit upon backward movement of the controller. If the mechanical means failed, for some reason, to operate, the electrical preventing means would come into play and, on the other hand, the mechanical means, if in working order, eliminates the possibility of reclosing the motor circuit by a backward movement of the control drum through all the successive positions from the "off" position to the position *a*.

It will be understood that my invention is not limited to the particular type of control system that is illustrated and that, for example, series-parallel or other motor control arrangements may be utilized, if desired, in connection with the present invention. Furthermore, in addition to the drum type of controller that is shown, the invention may be readily applied to master controllers, face-plate controllers, or to controllers of the type that embody a plurality of switches that are actuated by means of suitable cams on a controller shaft.

Furthermore, I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a multi-position control drum adapted for unlimited movement in one direction, of a dynamo-electric machine governed by said drum, contact means carried by the drum for successively effecting gradual increases of the electrical energy supplied to the machine and an opening of the circuit as the drum occupies its successive positions, and an arrangement of drum circuits to prevent the reclosure of the machine circuit, upon a backward movement of the drum, until a predetermined initial position of the drum is reached.

2. In a system of control, the combination with a supply circuit and an electric motor, of a multi-position control drum adapted for unlimited movement in a forward direction to control the energy supply to the motors and to subsequently interrupt certain of the motor circuits, a switch for opening and closing the main circuit, and means associated with the controller for effecting the closure of the switch only in a predetermined controller position while maintaining such closure throughout the forward range of operation of the controller.

3. In a system of control, the combination with a supply circuit and an electric motor, of a multi-position control drum adapted for unlimited movement in a forward direction to control the energy supply to the motors and to subsequently interrupt certain of the motor circuits, a switch for opening and closing the main circuit and having an actuating coil and auxiliary interlock contact members, a pair of auxiliary control fingers bridged by an auxiliary contact segment of said drum in its initial operative position only, means for energizing said actuating coil through one of said auxiliary control fingers to effect the initial closure of said switch, and means for maintaining the energization of said coil throughout the range of forward operation of the controller through a circuit including the other auxiliary control finger and said interlock contact members.

4. In a system of control, the combination with a multi-position control drum adapted for unlimited movement in one direction, the final drum position effecting an opening of the controlled circuits of said system, of electrical means coöperating with the drum to prevent a reclosure of such circuits upon a backward movement of the drum from said final position.

In testimony whereof I have hereunto subscribed my name this 27th day of Oct. 1916.

PAUL L. MARDIS.